United States Patent [19]

Bleys

[11] Patent Number: 5,521,226

[45] Date of Patent: May 28, 1996

[54] METHOD OF PRODUCING RESILIENT POLYOXYALKYLENE POLYURETHANE FOAMS

[75] Inventor: Geert Bleys, Heverlee, Belgium

[73] Assignee: Imperial Chemical Industries PLC, London, England

[21] Appl. No.: 378,999

[22] Filed: Jan. 27, 1995

Related U.S. Application Data

[63] Continuation of Ser. No. 992,279, Dec. 16, 1992, abandoned.

[30] Foreign Application Priority Data

Dec. 17, 1991 [GB] United Kingdom ............... 9126740.1

[51] Int. Cl.$^6$ ...................... C08J 9/04; C08J 9/08; C08G 18/48
[52] U.S. Cl. ............ 521/174; 521/137; 521/159; 521/170; 521/173; 521/176; 521/914; 528/76; 528/77
[58] Field of Search .................... 521/137, 159, 521/170, 173, 174, 176, 914; 528/76, 77

[56] References Cited

U.S. PATENT DOCUMENTS 3,509,077  4/1970  Shultz .................... 521/174
3,857,800  12/1974  Fishbein et al. ............ 521/174
4,144,386  3/1979  Consoli et al. ............. 521/174
4,289,856  9/1981  Yamamoto et al. ........... 521/174
4,575,520  3/1986  Kapps et al. .............. 521/176
4,782,099  11/1988  Dietrich et al. ........... 521/175
4,786,704  11/1988  Hughes et al. ............. 528/65
4,833,176  5/1989  Wolf et al. ............... 521/160
4,929,646  5/1990  Nichols et al. ............ 521/174
5,001,167  3/1991  Wiltz, Jr. et al. ......... 521/174
5,059,633  10/1991  Lutter et al. ............. 521/160
5,063,253  11/1991  Gansen et al. ............. 521/159
5,128,381  7/1992  Tane et al. ............... 521/176
5,237,036  8/1993  Spitzer .................... 521/176
5,441,993  8/1995  Maretti .................... 521/174

FOREIGN PATENT DOCUMENTS 380993   8/1990  European Pat. Off. .
404441   12/1990 European Pat. Off. .
422811   4/1991  European Pat. Off. .
433878   6/1991  European Pat. Off. .
1365632  9/1974  United Kingdom .

*Primary Examiner*—James J. Seidleck
*Assistant Examiner*—Rabon Sergent

[57] ABSTRACT

Polyol composition comprising a polyol having a high functionality and a high ethylene oxide content and another polyol. Process for preparing a flexible foam from such polyols.

9 Claims, No Drawings

METHOD OF PRODUCING RESILIENT POLYOXYALKYLENE POLYURETHANE FOAMS

This is a continuation of application Ser. No. 07/992,279 filed on Dec. 16, 1992, now abandoned.

This invention relates to polyol compositions useful in the manufacture of polyurethane flexible foams and to methods for the manufacture of said foams.

The manufacture of polyurethane flexible foams by reacting organic polyisocyanates such as tolylene diisocyanate (TDI) or diphenylmethane diisocyanate (MDI) with polyether polyol in conjunction with a foaming agent is well established. The polyethers are usually polyoxypropylene polyols derived from propylene oxide or poly(oxypropylene-oxyethylene) polyols derived from various combinations of propylene and ethylene oxides. Ethylene oxide tipped polyoxypropylene polyols wherein the oxyethylene groups constitute a minor proportion of the total oxyalkylene residues are particularly important because of their enhanced reactivity towards isocyanates. Polyols having higher oxyethylene contents, for example 50% or more on a weight basis, are often employed as minor additives to ensure that the foams have an open-cell structure. The most frequently used polyols in flexible foam manufacture are diols and triols.

It has been found that flexible foam having valuable properties, including excellent resilience, can be prepared from polyol compositions containing certain proportions of higher functionality polyols having relatively high oxyethylene contents.

Accordingly, the invention provides a polyol composition having an average nominal hydroxyl functionality of from 2.5 to 6, said composition comprising:

(a) from 5 to 30% by weight of a polyoxyalkylene polyol having an average nominal hydroxyl functionality of at least 4, an average hydroxyl equivalent weight of from 100 to 1500 and preferably 100–1000 and an oxyethylene content of at least 50% by weight and (b) from 95 to 70% by weight of another polyol.

The term "average nominal hydroxyl functionality" is used herein to indicate the average functionality (number of hydroxyl groups per molecule) of the polyol composition on the assumption that the average functionality of the polyoxyalkylene polyols is identical with the average functionality (number of active hydrogen atoms per molecule) of the initiator(s) used in their preparation although in practice it will often be somewhat less because of some terminal unsaturation.

Polyoxyalkylene polyols having the characteristics required by component (a) are known in the art and may be obtained in conventional manner by reacting ethylene oxide alone, or ethylene and propylene oxides simultaneously and/or sequentially in any order, with an initiator such as a polyol, a polyamine and the like having at least four active hydrogen atoms.

Polyol component (b) suitably has an average nominal hydroxyl functionality of from 2 to 6, especially 2 to 4, and an average hydroxyl equivalent weight of from 1000 to 3000 and may be selected from any of the classes of polyols known for use in polyurethane manufacture, for example polyesters, polyester-amides, polythioethers, polycarbonates, polyacetals, polyolefins and polysiloxanes. It is preferred, however, that component (b) is a polyoxyalkylene polyol differing from component (a) in functionality and/or oxyethylene content. Thus, component (b) may be, for example, a polyoxyalkylene triol having an oxyethylene content below 50%, typically below 20%, by weight.

Preferred polyol compositions contain at least 6, preferably at least 6 to less than 20 and more preferably 10 to less than 20% by weight of component (a). Furthermore, it is preferred that the polyoxyalkylene polyol constituting component (a) possesses at least one of the following features:

(i) the average nominal hydroxyl functionality is greater than 4 for example 6;

(ii) the oxyethylene content is at least 70%, for example 90 to 100%, by weight.

If desired, the polyoxyalkylene polyol (or one or more of the polyoxyalkylene polyols when a mixture of such is used) may contain dispersed polymer particles. Such polymer-modified polyols have been fully described in the prior art and include products obtained by the in situ polymerisation of one or more vinyl monomers, for example acrylonitrile and styrene, in polyoxyalkylene polyols or by the in situ reaction between a polyisocyanate and an amino- or hydroxy-functional compound, for example triethanolamine, in the polyoxyalkylene polyol.

The aforementioned polyol compositions are of particular value in the manufacture of flexible polyurethane foams, especially foams having resilience figures, as measured by the ISO 8307 method, of at least 55% and preferably at least 58%.

Accordingly, in a further aspect, the invention provides for a method for the preparation of flexible polyurethane foams by reacting in the presence of a foaming agent a polyisocyanate and at least two polyols together having an average nominal hydroxyl functionality of from 2.5 to 6, the first polyol being used in an amount of from 5 to 30% by weight calculated on the amount of the two polyols and the first polyol being a polyoxyalkylene polyol having an average nominal hydroxyl functionality of at least 4, an average hydroxyl equivalent weight of from 100 to 1500 and an oxyethylene content of at least 50% by weight, and the second polyol being another polyol and being used in an amount of from 95 to 70% by weight calculated on the amount of the two polyols.

Organic polyisocyanates which may be used in the preparation of flexible foams include aliphatic, cycloaliphatic and araliphatic polyisocyanates but especially those aromatic polyisocyanates, for example tolylene diisocyanate (TDI) and diphenylmethane diisocyanate (MDI) conventionally used in the manufacture of flexible foams.

Preferred polyisocyanates are diphenylmethane diisocyanate compositions, especially compositions which are liquid at normal room temperatures. Suitable polyisocyanates therefore include liquid mixtures of MDI isomers, especially mixtures containing the 4,4'-isomer together with not more than 60% of the 2,4'-isomer and not more than 5% of the 2,2'-isomer, said components being expressed as weight percentages of the total composition.

Further diphenylmethane diisocyanate compositions which may be used include compositions consisting of or containing polymethylene polyphenylene polyisocyanates. Thus, mixtures may be used containing at least 70% by weight of pure MDI (4,4'-isomer or isomer mixture) and up to 30% by weight of the so-called polymeric MDI containing from 25 to 65% by weight of diisocyanates, the remainder being largely polymethylene polyphenylene polyisocyanates having isocyanate functionalities greater than 2. Mixtures may also be used of pure MDI and polymeric MDI compositions containing higher proportions (up to 100%) of the said higher functionality polyisocyanates.

Other MDI compositions which may be used include modified forms of MDI, that is to say MDI modified in known manner by the introduction of, for example, urethane, allophanate, urea, biuret, carbodiimide, uretonimine or isocyanurate residues. Other modified forms of MDI which may be used include polyurea dispersions in MDI such as have been described, for example, in EP-A-0 103 996.

Still further diphenylmethane diisocyanate compositions which may be used include mixtures of the above described MDI isomers, isomer mixtures, polymeric MDI, modified MDI and the like and up to 20% by weight of another polyisocyanate or mixture of polyisocyanates. Other polyisocyanates which may be used in admixture with the MDI include aliphatic, cycloaliphatic and araliphatic polyisocyanates, especially diisocyanates, for example hexamethylene diisocyanate, isophorone diisocyanate, cyclohexane-1,4-diisocyanate, 4,4'-dicyclohexylmethane diisocyanate and m- and p-tetramethylxylene diisocyanates and, especially, aromatic polyisocyanates such as tolylene and phenylene diisocyanates.

The preferred foaming agent for use in the method of the invention is water, optionally in conjunction with a physical blowing agent, for example a low boiling organofluoro compound. The amount of foaming agent may be varied in known manner in order to achieve the desired foam density, suitable amounts of water being, for example, from 0.25 to 20, preferably 0.25–8 and most preferably 0.25 to less than 5% by weight based on the weight of polyol composition. Preferably water is the only foaming agent. The isocyanate index of the reaction system, taking account of the polyol composition, water and any other isocyanate-reactive species, for example chain extenders or cross-linking agents, may be as low as 10 or as high as 120.

The foam-forming reaction mixture may contain one or more of the additives conventional to such reaction mixtures. Such additives include catalysts, for example tertiary amines and tin compounds, surface-active agents and foam stabilisers, for example siloxane-oxyalkylene copolymers, chain extenders, for example low molecular weight diols or diamines, cross-linking agents, for example triethanolamine, flame retardants, organic and inorganic fillers, pigments, agents for suppressing the so-called boiling-foam effect such as poly-dimethyl siloxanes, and internal mould release agents.

Accordingly, in a further aspect, the invention provides a reaction system comprising:

(i) a polyisocyanate component;

(ii) a polyol composition having an average nominal hydroxyl functionality of from 2.5 to 6, said composition comprising:
(a) from 5 to 30% by weight of a polyoxyalkylene polyol having an average nominal hydroxyl functionality of at least 4, an average hydroxyl equivalent weight of from 100 to 1500 and an oxyethylene content of at least 50% by weight, and
(b) from 95 to 70% by weight of another polyol;

(iii) a foaming agent comprising water, and, optionally, (iv) one or more additives conventional to foam formulations. Such a reaction system is preferably used for making flexible foams. The term "reaction system" is defined as a combination of components wherein the polyisocyanate component is kept in a container separate from the isocyanate-reactive components.

In operating the method of the invention, the known one-shot, semi-prepolymer or full prepolymer techniques may be used together with conventional mixing equipment and the foams may be produced in the form of slabstock, mouldings and the like. When the prepolymer techniques are employed each of the two polyols alone or in admixture may be used to prereact with polyisocyanate. The amounts indicated before are in such a case calculated on the polyol in the prepolymer and the polyol in the polyol composition.

The invention is illustrated but not limited by the following Examples in which all parts, percentages and ratios are by weight.

The following glossary of materials is included to identify reaction components not otherwise identified in the Examples.

Glossary

F2805 is Daltocel F2805, an ethylene oxide-tipped polyoxypropylene triol having an oxyethylene content of 15% and a molecular weight of 6000, commercially available from Imperial Chemical Industries PLC. Daltocel is a trademark of ICI.

G2005 is Atlas G2005, a polyoxyethylene hexol having a molecular weight of 1800, commercially available from Imperial Chemical Industries PLC.

A2580 is Arcol 2580, a polyether triol having random oxyethylene and oxypropylene residues with a 77% oxyethylene content and a molecular weight of 4000, commercially available from Arco.

Polyol X is a hexafunctional polyol with an EO content of 15% by weight and $OH_v=160$.

Polyol Y is a hexafunctional polyol with an EO content of 15% by weight and $OH_v=91$.

Polyol Z is a hexafunctional polyol with an EO content of 75% by weight and $OH_v=41$.

PBA 2185 is polymeric MDI having an NCO content of 30.7% available from Imperial Chemical Industries PLC.

Prepolymer A having an NCO content of 6% obtained by reacting 75 pbw of a triol of OH value=36 (13% EO-tip) with 25 pbw MDI (10% 2,2'+2,4').

Niax A1: catalyst obtainable from Union Carbide.

Dabco 33LV: catalyst obtainable from Air Products.

Dabco EG: catalyst obtainable from Air Products.

Dabco 80/20: catalyst obtainable from Air Products.

B4113 is Tegostab B4113, a silicone surfactant available from Goldschmidt AG. Tegostab is a trademark of Goldschmidt.

Resilience was measured according to ISO 8307; CLD 40% and hysteresis loss were measured according to ISO 3386-I.

EXAMPLE 1

Flexible foams were made by bench mixing the formulations given in Table 1, the amounts are in parts by weight. Table 1 also gives the properties of the foams obtained.

TABLE 1

| Comparative Example: A2580 (Triol) | | | | | |
|---|---|---|---|---|---|
| Experiment | 1 | 2 | 3 | 4 | 5 |
| Prepolymer A | 90 | 90 | 90 | 90 | 90 |
| PBA 2185 | 10 | 10 | 10 | 10 | 10 |
| 33LV | 0.8 | 0.8 | 0.8 | 0.8 | 0.8 |
| Niax A1 | 0.1 | 0.1 | 0.1 | 0.1 | 0.1 |
| A2580 | 0 | 2 | 4 | 6 | 10 |
| water | 1.8 | 1.8 | 1.8 | 1.8 | 1.8 |
| index | 100 | 99 | 98 | 98 | 96 |
| density, kg/m³ | 51 | 56 | 57 | 55 | 58 |
| CLD 40%, kPa | 3.4 | 4.1 | 3.5 | 4.8 | 3.7 |
| hysteresis loss, % | 29 | 22 | 18 | 19 | 16 |
| resilience, % | 49 | 54 | 54 | 52 | 45 |

| Example: G2005: Hexafunctional polyol | | | | | |
|---|---|---|---|---|---|
| Experiment | 6 | 7 | 8 | 9 | 10 |
| Prepolymer A | 90 | 90 | 90 | 90 | 90 |
| PBA 2185 | 10 | 10 | 10 | 10 | 10 |
| 33LV | 0.8 | 0.8 | 0.8 | 0.8 | 0.8 |
| Niax A1 | 0.1 | 0.1 | 0.1 | 0.1 | 0.1 |
| G2005 | 0 | 2 | 4 | 6 | 10 |
| water | 1.8 | 1.8 | 1.8 | 1.8 | 1.8 |
| index | 100 | 100 | 100 | 100 | 100 |
| density, kg/m³ | 51 | 56 | 60 | 61 | 62 |
| CLD 40%, kPa | 3.4 | 4.5 | 4.6 | 4.4 | 3.5 |
| hysteresis loss, % | 29 | 23 | 19 | 18 | 15 |

TABLE 1-continued

| resilience, % | 49 | 52 | 54 | 59 | 60 |

EXAMPLE 2

Flexible foams were made by reacting a polyisocyanate with a reaction mixture containing a polyether hexol having a high oxyethylene content, the formulations (parts by weight) and foam properties being given in Table 2.

TABLE 2

| Experiment | 1 | 2 | 3 | 4 |
|---|---|---|---|---|
| F2805 | 100 | 95 | 90 | 85 |
| G2005 | 0 | 5 | 10 | 15 |
| Niax A1 | 0.1 | 0.1 | 0.1 | 0.1 |
| Dabco 33LV | 0.5 | 0.5 | 0.5 | 0.5 |
| B4113 | 0.5 | 0.5 | 0.5 | 0.5 |
| water | 3 | 3 | 3 | 3 |
| PBA 2185 | 46 | 47 | 49 | 50 |
| index | 90 | 89 | 90 | 90 |
| density, kg/m$^3$ | 46 | 56 | 57 | 61 |
| resilience, % | 54 | 61 | 65 | 70 |
| CLD 40%, kPa | 3.5 | 6.1 | 4.7 | 3.8 |
| hysteresis loss, % | 27 | 22 | 17 | 15 |

EXAMPLE 3

Several other flexible foams were made from the compositions mentioned in Table 3 (parts by weight). Those indicated as * are comparative experiments.

TABLE 3

| Experiment | 1* | 2* | 3* | 4* | 5* | 6 | 7 | 8 | 9* | 10 | 11 |
|---|---|---|---|---|---|---|---|---|---|---|---|
| F 2805 | 50 | 95 | 90 | 95 | 90 | 95 | 90 | 85 | 100 | 95 | 85 |
| G 2005 | 50 | — | — | — | — | — | — | — | — | — | — |
| Polyol X | — | 5 | 10 | — | — | — | — | — | — | — | — |
| Polyol Y | — | — | — | 5 | 10 | — | — | — | — | — | — |
| Polyol Z | — | — | — | — | — | 5 | 10 | 15 | 0 | 5 | 15 |
| Niax A1 | — | 0.1 | 0.1 | 0.1 | 0.1 | 0.1 | 0.1 | 0.1 | — | — | — |
| Dabco 33LV | — | 0.5 | 0.5 | 0.5 | 0.5 | 0.5 | 0.5 | 0.5 | 1.5 | 1.5 | 2.5 |
| Dabco EG | 0.4 | — | — | — | — | — | — | — | — | — | — |
| Dabco 80/20 | 0.2 | — | — | — | — | — | — | — | — | — | — |
| Water | 3 | 3 | 3 | 3 | 3 | 3 | 3 | 3 | 10 | 10 | 10 |
| PBA 2185 | 72.2 | 48.5 | 50.5 | 47.9 | 48.6 | 47.3 | 47.5 | 47.7 | 47.5 | 47.5 | 47.5 |
| Index | 100 | 90 | 90 | 90 | 90 | 90 | 90 | 90 | 30 | 30 | 30 |
| Free rise Density, Kg/m$^3$ | — | 39.5 | 38.7 | 42.5 | 40.1 | 43.5 | 41.7 | 40.8 | 31.5 | 34.9 | 49.9 |
| Resilience, % | — | 49 | 40 | 52 | 48 | 64 | 68 | 69 | 35 | 37 | 50 |
| CLD, 40%, kPa | — | 3.7 | 4.7 | 3.9 | 3.8 | 3.2 | 2.6 | 2.5 | 2.5 | 2.5 | 3.2 |

Comments to Experiment 1: the foam collapsed.

I claim:

1. A method for the preparation of flexible polyurethane foams having a resilience of at least 58% measured according to ISO 8307, comprising reacting a diphenylmethane diisocyanate composition, at least two polyols together having an average nominal hydroxyl functionality of from 2.5 to 6 and a foaming agent, wherein the first polyol is used in an amount of from 5 to 30% by weight calculated on the amount of the two polyols and the first polyol is a polyoxyalkylene polyol having an average nominal hydroxyl functionality of greater than 4 to 6, an average hydroxyl equivalent weight of from 100 to 1500 and an oxyethylene content of at least 70% by weight, and the second polyol is used in an amount of from 95 to 70% by weight calculated on the amount of the two polyols, said second polyol having an average nominal hydroxyl functionality of 2 to 6, an average hydroxyl equivalent weight of from 1000 to 3000 and an oxyethylene content below 50% by weight.

2. A method according to claim 1, wherein the foaming agent comprises water, optionally in conjunction with a physical blowing agent.

3. A method according to claim 2, wherein the amount of water is 0.25 to 20% by weight based on the weight of the two polyols.

4. A method according to claim 3 wherein the amount of water is 0.25 to less than 5% by weight based on the weight of the two polyols.

5. A method according to claim 1, wherein the second polyol has an average nominal hydroxyl functionality of from 2 to 4 and an oxyethylene content below 20% by weight.

6. A method according to claim 1, comprising at least 6 to less than 20% by weight of said first polyol.

7. A method according to claim 1, wherein the first polyol has an oxyethylene content of from 90 to 100% by weight.

8. A method according to claim 1, wherein the first polyol has an average hydroxyl equivalent weight of 100 to 300.

9. A reaction system comprising:
(i) a polyisocyanate
(ii) a polyol composition as defined in claim 1 and
(iii) a foaming agent comprising water.

* * * * *